(12) United States Patent
Perraut et al.

(10) Patent No.: US 8,888,181 B2
(45) Date of Patent: Nov. 18, 2014

(54) SEAT BOTTOM TILT DRIVE FOR VEHICLE SEAT

(71) Applicant: Faurecia Automotive Seating, LLC, Troy, MI (US)

(72) Inventors: John Perraut, Rochester Hills, MI (US); Yanyang Zhang, Troy, MI (US)

(73) Assignee: Faurecia Automotive Seating, LLC, Troy, MI (US)

( * ) Notice: Subject to any disclaimer, the term of this patent is extended or adjusted under 35 U.S.C. 154(b) by 113 days.

(21) Appl. No.: 13/722,310

(22) Filed: Dec. 20, 2012

(65) Prior Publication Data

US 2013/0169015 A1 Jul. 4, 2013

Related U.S. Application Data

(60) Provisional application No. 61/581,795, filed on Dec. 30, 2011.

(51) Int. Cl.
*B60N 2/02* (2006.01)
*B60N 2/18* (2006.01)
*B60N 2/23* (2006.01)

(52) U.S. Cl.
CPC ............. *B60N 2/233* (2013.01); *B60N 2/181* (2013.01); *B60N 2/1803* (2013.01); *B60N 2/23* (2013.01); *B60N 2/1853* (2013.01); *B60N 2/1842* (2013.01)
USPC ....................................... 297/284.11; 297/330

(58) Field of Classification Search
USPC ................... 297/284.11, 330, 344.17, 362.14
See application file for complete search history.

(56) References Cited

U.S. PATENT DOCUMENTS

| | | | |
|---|---|---|---|
| 6,419,317 B1 * | 7/2002 | Westrich et al. | 297/284.11 |
| 6,702,383 B2 * | 3/2004 | Newman et al. | 297/313 |
| 6,908,149 B1 * | 6/2005 | Yamaguchi et al. | 297/216.1 |
| 7,340,974 B2 * | 3/2008 | Landskron et al. | 297/362.14 |
| 7,458,294 B2 * | 12/2008 | Dohles et al. | 74/606 R |
| 8,382,205 B2 * | 2/2013 | Teer | 297/344.17 |
| 8,393,681 B2 * | 3/2013 | Gross et al. | 297/284.11 |
| 2004/0055806 A1 * | 3/2004 | Masuda et al. | 180/282 |

* cited by examiner

*Primary Examiner* — Peter Brown
(74) *Attorney, Agent, or Firm* — Reising Ethington P.C.

(57) ABSTRACT

A vehicle seat is equipped with a seat tilt mechanism capable of adjusting the amount one seat component is tilted relative to another. The tilt mechanism can couple a seat frame with a seat pan to adjust the relative amount of tilt therebetween. The tilt mechanism includes a housing and a bracket in sliding engagement with a surface of the housing that faces away from the seat pan during use. The bracket may include a bearing surface in sliding engagement with the housing. The bracket can be monolithic with generally U-shaped side walls extending away from the seat pan on opposite sides of the housing. Each side wall may extend partially around the housing with the seat pan providing structure that closes off the open end of the U-shape. The mechanism includes an optional cap on the seat pan side of the housing that may provide a low-friction bearing surface.

15 Claims, 4 Drawing Sheets

SEAT BOTTOM TILT DRIVE FOR VEHICLE SEAT

This application claims the benefit of U.S. Provisional Patent Application No. 61/581,795 filed Dec. 30, 2011, the entire contents of which are hereby incorporated by reference.

TECHNICAL FIELD

The present disclosure relates generally to vehicle seating assemblies and, more particularly, to adjustment mechanisms for vehicle seating assemblies.

BACKGROUND

Vehicle seats are sometimes configured to be adjustable to fit a variety of seated vehicle occupants according to their individual sizes and comfort standards. For example, a vehicle seat back may be configured to tilt forward and backward relative to a seat bottom, and/or the entire vehicle seat may be configured to move forward and backward with respect to the floor of the vehicle. Portions of the seat may be configured for simultaneous or independent adjustment by the occupant.

In U.S. Pat. No. 7,458,294 to Dohles et al., a spindle or worm drive is described for use with adjustment devices in motor vehicles. The device is secured with a fixed spindle or a fixed tooth rack to the first of two parts and is provided with a gear mechanism connected to the second of the two parts. A bearing shell encloses the gear housing and includes multiple pieces welded together to provide structure completely around the gear housing before it is attached to the second of the two parts to make it adjustable relative to the first of the two parts.

SUMMARY

In accordance with one embodiment, a vehicle seat includes a seat base adapted for mounting to a vehicle floor, a seat back coupled to and extending up from the seat base, a seat bottom supported by the seat base, and a seat tilt mechanism. The seat bottom includes a frame and a seat pan pivotally coupled with the frame. The seat tilt mechanism includes a housing having first and second oppositely facing external bearing surfaces, a rod pivotally coupled with the frame and extending through the housing along an axis, an actuator coupled with the rod and adapted to move the rod relative to the housing along said axis when activated, and a bracket that couples the housing with the seat pan. The second external bearing surface faces away from the seat pan, and the bracket has a curved bearing surface in sliding engagement with the second external bearing surface. The seat pan tilts relative to the frame, and the housing pivots within the bracket when the actuator moves the rod relative to the housing.

In at least one embodiment, the vehicle seat includes a cap located between the housing and the seat pan. The cap has a bearing surface in sliding engagement with the first bearing surface.

In at least one embodiment, wherein the bearing surface of the cap comprises a polymeric material.

In at least one embodiment, the cap is adapted for attachment to the bracket so that the housing remains coupled with the bracket when the bracket is uncoupled from the seat pan.

In at least one embodiment, the bracket is formed from a metallic material.

In at least one embodiment, the bracket is monolithic.

In at least one embodiment, the bracket includes first and second spaced apart side walls extending away from the seat pan on opposite sides of the housing. The sidewalls have curved bearing surfaces in sliding engagement with the housing.

In at least one embodiment, the housing includes first and second channels that each accommodate one of the bracket side walls. Each of the channels has a bearing surface in sliding engagement with one of the curved bearing surfaces.

In at least one embodiment, the housing includes a plurality of ribs extending toward the seat pan and a corresponding plurality of bearing surfaces at distal ends of the ribs. The first bearing surface is one of said corresponding plurality of bearing surfaces.

In at least one embodiment, the rod is a threaded rod and the actuator is coupled with the threaded rod via a gear train having an internally threaded nut intermeshed with the threaded rod so that relative rotational movement between the rod and the nut translates the rod relative to the housing along said axis.

In at least one embodiment, the bracket is coupled to the seat pan at a location that causes a front edge of the seat bottom to pivot about a pivot axis.

In accordance with another embodiment, a seat tilt mechanism for use with a vehicle seat having a frame and a component pivotally attached to the frame includes a housing having first and second oppositely facing external bearing surfaces, a rod adapted for pivotal attachment to the frame and extending through the housing along an axis, an actuator coupled with the rod and adapted to move the rod relative to the housing along the axis when activated, and a bracket adapted for attachment to the seat component at a fixed location along the seat component so that the bracket couples the housing with the seat component with the second external bearing surface facing away from the seat component. The bracket has a curved bearing surface in sliding engagement with the second external bearing surface to allow the housing to rotate within the bracket.

In at least one embodiment, the vehicle seat includes a cap attached to the bracket that provides a bearing surface in sliding engagement with the first external bearing surface.

In at least one embodiment, the housing includes a pair of spaced apart channels, and the bracket includes a pair of spaced apart side walls in sliding engagement with the pair of channels.

In at least one embodiment, the rod is a threaded rod and the actuator is coupled with the threaded rod via a gear train having an internally threaded nut intermeshed with the threaded rod so that relative rotational movement between the rod and the nut translates the rod relative to the housing along the rod axis.

DESCRIPTION OF THE DRAWINGS

One or more embodiments will hereinafter be described in conjunction with the appended drawings, wherein like designations denote like elements, and wherein.

DETAILED DESCRIPTION OF EMBODIMENT(S)

A vehicle seat may be equipped with a tilt mechanism capable of adjusting the amount one seat component is tilted relative to another. For example, the tilt mechanism can couple a seat frame to a seat pan to adjust the amount of tilt of the seat pan relative to the seat frame. The tilt mechanism may include a housing and a bracket that supports and slidingly engages a surface of the housing that faces away from the seat pan during use, thereby allowing the housing to rotate within the bracket as the seat pan moves. The bracket may include one or more curved bearing surface(s) in sliding engagement with one or more channel(s) of the housing. The bracket can be monolithic with generally U-shaped side walls extending away from the seat pan on opposite sides of the housing, with each side wall extending partially about the housing and with the seat pan providing the structure that closes off the open end of the U-shape, thus potentially eliminating the need for multi-component weldments and providing the option for the use of low friction cap of material on the side of the housing opposite the bracket. The disclosed seat tilt mechanism may also be configured for improved crash-worthiness compared to other types of adjustment mechanisms.

Figure 1:
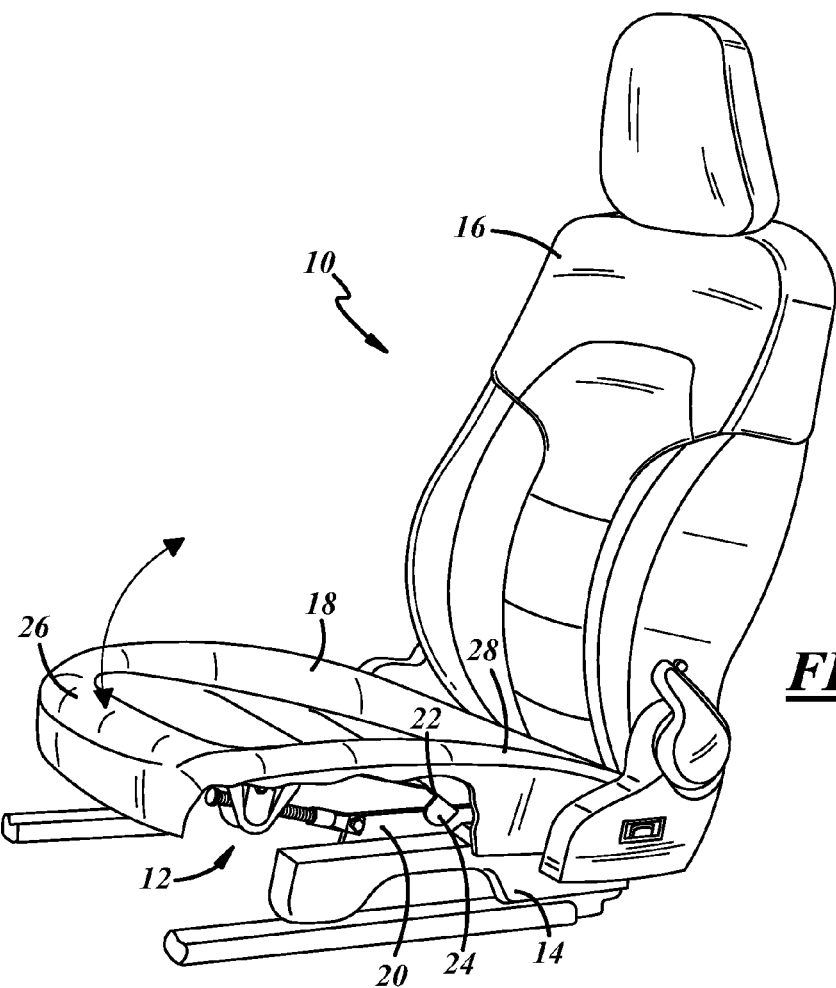
FIG. 1 is a cutaway view of one embodiment of a vehicle seat including a seat tilt mechanism.

With reference to FIG. 1, there is shown an illustrative vehicle seat 10, including a seat tilt mechanism 12, according to one embodiment. The seat 10 also includes a seat base 14, a seat back 16, and a seat bottom 18. The seat base 14 is adapted for mounting to a vehicle floor. The seat back 16 is coupled to and extends up from the seat base 14. The illustrated seat bottom 18 is supported by the seat base 14, and includes a frame 20, a seat pan 22, and one or more layers of padding, foam, or other cushioning overlying the frame and seat pan. The seat pan 22 is pivotally coupled with the frame 20 in this embodiment. The seat tilt mechanism 12 may be included as part of the seat bottom 18, or it may be a separately provided component for attachment to the seat bottom. The seat tilt mechanism 12 in the embodiment of FIG. 1 is configured to tilt the seat pan 22 relative to the frame 20 about a pivot axis 24 so that a front edge 26 of the seat bottom 18 is moved toward or away from the vehicle floor relative to a rear portion 28 of the seat bottom. The direction of motion is indicated by the unnumbered double arrow. The seat bottom 18 is shown in a first or flat position in FIG. 1.

Figure 2:
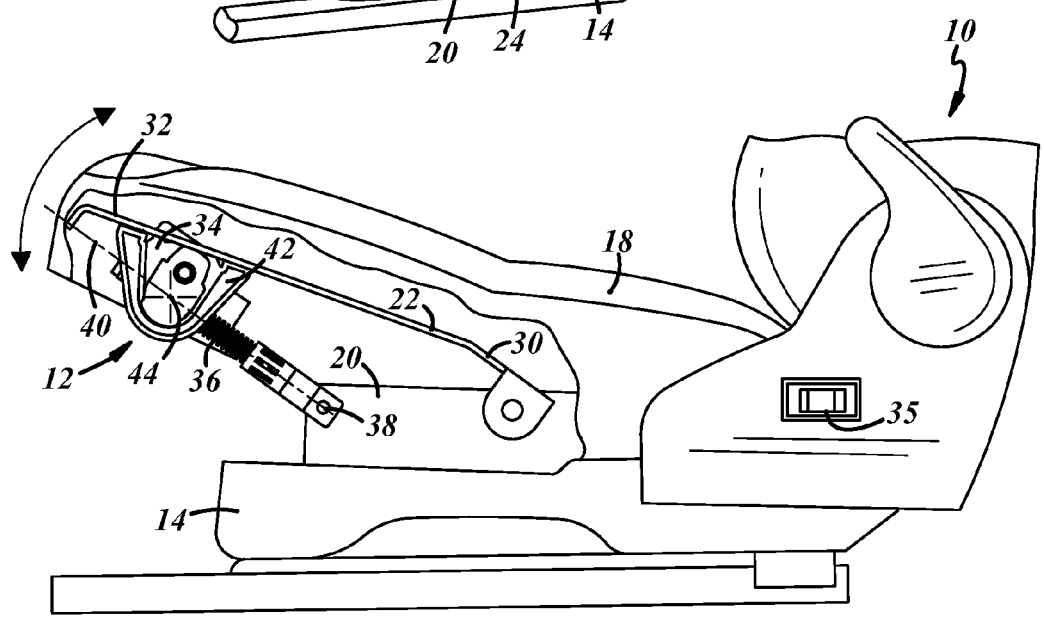
FIG. 2 is a partial side view of the vehicle seat of FIG. 1, showing the seat bottom in a tilted position with respect to FIG. 1.

FIG. 2 is an enlarged side view of a portion of the vehicle seat 10 of FIG. 1 and shows the seat bottom 18 in a second or tilted position relative to the position shown in FIG. 1. In this example, the frame 20 of the seat bottom 18 is mounted on the seat base 14. The seat pan 22 has a first end 30 pivotally coupled to the frame 20 and a second end 32 spaced apart from the first end. The tilt mechanism 12 is coupled to the frame 20 and the seat pan 22 and is operable to pivot the seat pan relative to frame so that the seat bottom 18 can move between the first position of FIG. 1 and the second position of FIG. 2 and to other positions between and/or beyond the illustrated first and second positions.

The illustrated seat tilt mechanism 12 includes a housing 34 and a rod 36. The rod 36 is pivotally coupled with the frame 20 at another pivot axis 38. The rod 36 extends from the pivot axis 38 through the housing 34 along a longitudinal axis 40. The tilt mechanism 12 also includes an actuator (not shown in FIG. 2) that is coupled with the rod 36 and adapted to move the rod relative to the housing along the axis 40 when activated. A user-operated switch 35 may be provided as shown to activate the actuator and, thus, the tilt mechanism 12. In the particular examples shown in the figures, the rod 36 includes a threaded portion and is coupled with an electric motor as the actuator via a gear train, an example of which is shown in subsequent figures. However, the rod 36 may take on other forms such as a pneumatically or hydraulically actuated shaft, or a gear tooth rack, for example. The illustrated tilt mechanism 12 also includes a bracket 42 that couples the housing 34 with the seat pan 22. The bracket 42 is attached to the seat pan 22 at a fixed location along the seat pan. In the tilted position illustrated in FIG. 2, the housing 34 is shown moved along the axis 40 and away from the pivot axis 38 relative to the flat position of FIG. 1. The housing 34 is configured to rotate within the bracket 42 about another pivot axis 44 to accommodate the tilting movement.

Figure 3:
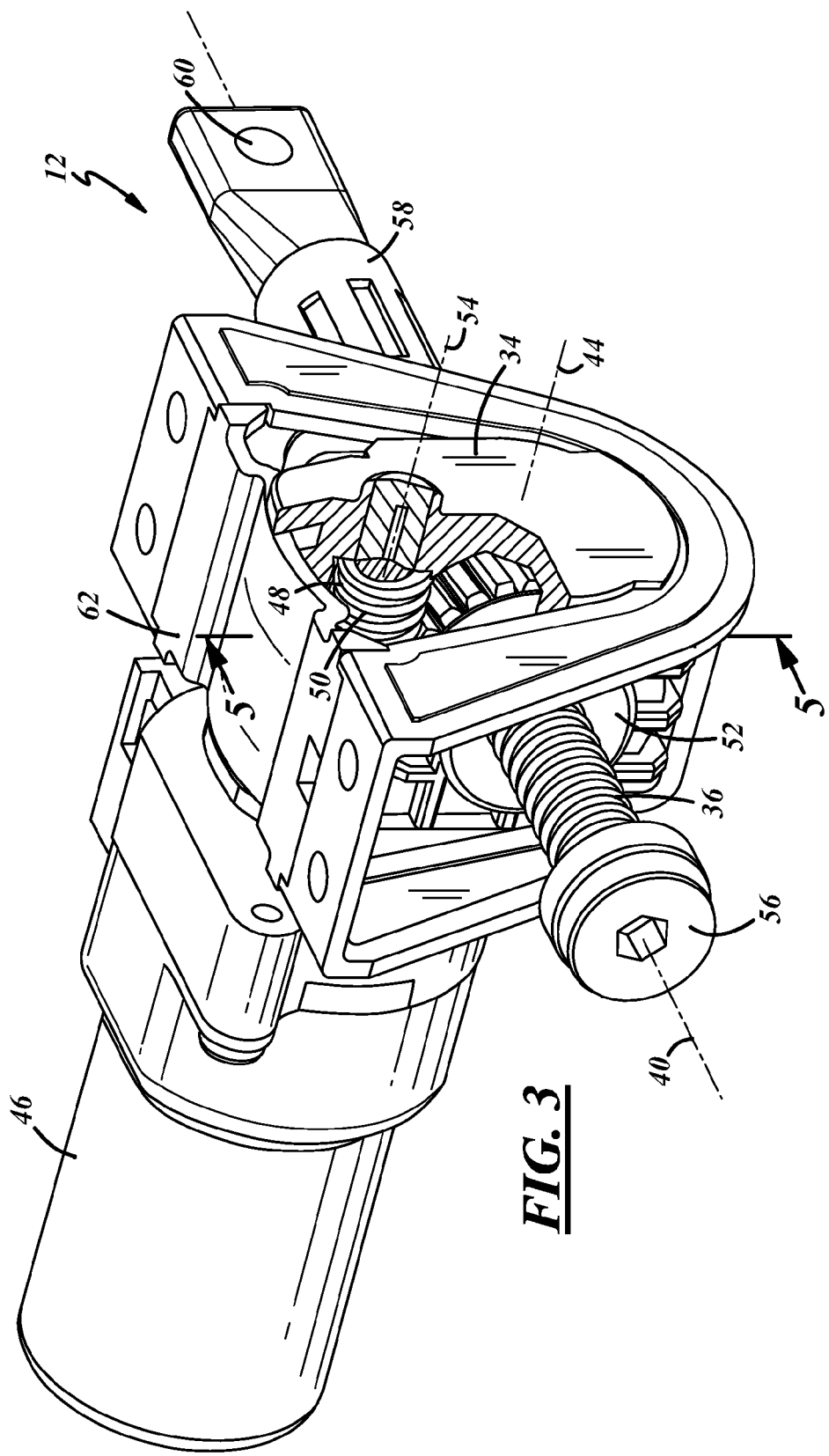
FIG. 3 is a perspective view of an embodiment of the seat tilt mechanism, partially cutaway to show a gear train.

Turning now to the cutaway view of FIG. 3, there is shown one embodiment of the seat tilt mechanism 12 uncoupled from the seat bottom of FIGS. 1 and 2. The actuator 46 is visible in this view and is an electric motor in this example. The motor 46 is coupled with the threaded rod 36 via a gear train 48. The gear train 48 is housed in the housing 34 and, in this embodiment, is a worm gear train. The gear train 48 includes a worm drive 50 and an internally threaded worm nut 52. The worm drive 50 is coupled with the motor 46 for rotation about an axis 54 that is parallel with the pivot axis 44. The worm drive 50 intermeshes with external teeth of the worm nut 52. The worm nut 52 is coaxial with the threaded portion of the rod 36, and the internal threads of the worm nut intermesh with the threaded rod. When the motor 46 is activated, the worm drive 50 rotates about its axis 54, and the rotational motion is transferred to rotational motion of the worm nut 52 about a different, perpendicular axis 40. The internal threads of the worm nut 52 engage the threads of the rod 36 to transform rotational motion of the worm nut to linear motion of the rod relative to the housing 34 along the longitudinal axis 40.

Thus, activation of the actuator 46 causes the housing 34 to change position along the rod 36. When attached to the seat bottom, as shown in FIGS. 1 and 2, for example, the changed position of the housing 34 along the rod 36 results in a changed position of the seat pan. In the illustrated example, the rod 36 also includes a stop 56 at one end and a connector portion 58 at an opposite end. Both the stop 56 and the connector portion 58 are sized so that each will contact the outside of the housing 34 to prevent the rod 36 from passing completely through the housing. The connector portion 58 also includes an aperture 60 to partially form the pivotable connection with the seat frame, as shown in FIGS. 1 and 2. As described in further detail below, the housing 34 is configured for rotation within the bracket 42 along various bearing surfaces and about the pivot axis 44 to accommodate the tilting movement of the seat pan. In the particular example shown in FIG. 3, the housing 34 is contained in the bracket 42 by a cap 60 that closes off the open end of the bracket and provides one of the bearing surfaces.

Figure 4:
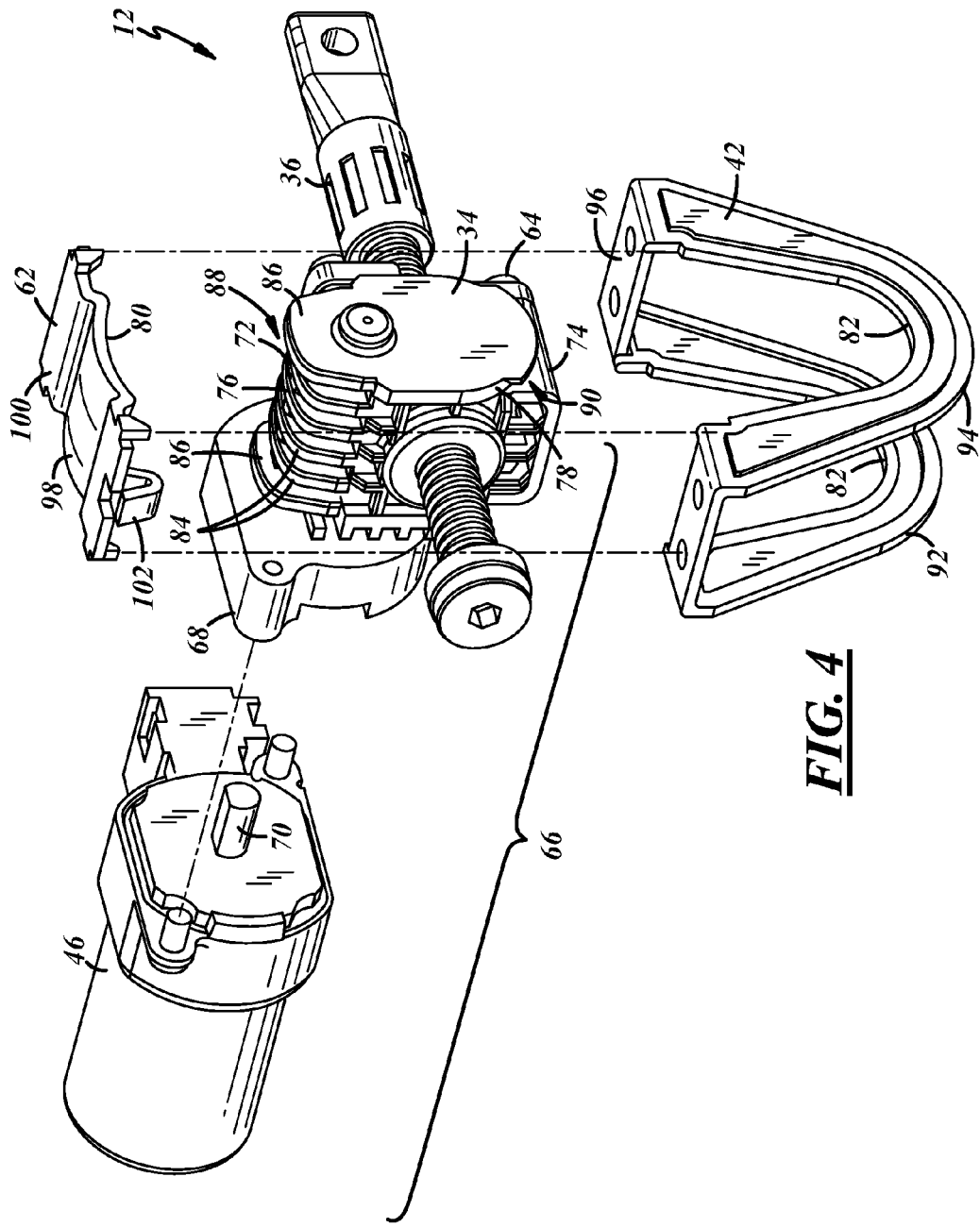
FIG. 4 is an exploded view of the seat tilt mechanism of FIG. 3.

FIG. 4 is an exploded view of the seat tilt mechanism 12 of FIG. 3. Shown separately in FIG. 4 are the actuator 46, the bracket 42, and the cap 62. The housing 34, gear train (not visible in FIG. 4), and threaded rod 36 are shown together as a subassembly and combine to form a gearbox 64. The actuator 46 and the gearbox may also be combined to form a drive unit 66 that can be coupled to a tiltable seat component via the bracket 42, with the cap 62 optionally included. In this particular example, a motor mounting block 68 is provided to accommodate attachment of the motor 46 to the gearbox 64, but mounting provisions may be provided as part of the gearbox housing 34. In the illustrated example, the motor 46 includes an output shaft 70 that extends through the mounting block 68 to couple with the gear train of the gearbox 64.

The housing 34 has a first or top side 72 and an opposite second bottom side 74. In use, the first side 72 is the side nearest the tilting seat component. The housing 34 includes one or more external bearing surface(s) 76 located at the first side 72 of the housing, as well as one or more oppositely facing bearing surfaces 78 located at the second side 50 of the housing. In the illustrated example, the cap 62 includes a bearing surface 80 that opposes a plurality of bearing surfaces 76 at the first side 72 of the housing 34. The opposing surfaces 76, 80 are adapted for sliding engagement with each other. The illustrated bracket 42 includes a pair of curved bearing surfaces 82 that oppose a pair of bearing surfaces 78 at the second side 74 of the housing 34. The opposing surfaces 78, 82 are adapted for sliding engagement with each other.

The illustrated housing 34 also includes a plurality of ribs 84 arranged along the top side 72 of the housing. Each rib 84 extends to a distal end, with each of the bearing surfaces 76 being located at the distal ends. Providing the interface between the first side 72 of the housing 34 with a plurality of bearing surfaces 76 at the ends of narrow ribs can help to reduce friction at the interface when compared to one large bearing surface and provide greater freedom of movement of the housing within the bracket 42. The illustrated housing 34 also includes a pair of flanges 86 located at opposite ends of the housing. In this example, each of the flanges 86 extends beyond the ends of the ribs 84 and bearing surfaces 76. A top channel 88 is formed between the flanges 86 and is sized to receive the cap 62, where provided. The flanges 86 also partly define a pair of bottom channels 90, sized and located to receive the bracket 42 and curved bearing surfaces 82, subsequently shown in greater detail.

The illustrated bracket 42 is configured to couple the drive unit 66 and all of its components with the tiltable component, such as the seat pan of FIGS. 1 and 2. In this embodiment, the bracket 42 includes first and second spaced apart side walls 92, 94 configured to be located on opposite sides of the housing 34 and to extend away from the seat component to which the bracket is mounted. In this example, each of the side walls 92, 94 forms an obtuse U-shape, with arcuate or otherwise curved bearing surfaces 82 located at the inside bottom of the U-shape. The side walls 92, 94 are interconnected by a pair of platforms 96 at the open end of the U-shape. The platforms 96 may be provided with holes or other means of accommodating bolts or fasteners for attachment to the tiltable seat component. In one embodiment, the bracket 42 is monolithic—i.e., it is formed from a single piece of material. For example, the illustrated bracket 42 may be formed from single piece of sheet metal with bends at the junctions of the platforms 96 and side walls 92, 94. Whether monolithic or not, the bracket may be formed from a metallic material, such as a steel alloy, or from any other material capable of withstanding crash loads. When provided as part of a seat assembly as shown, for example, in FIGS. 1 and 2, typical crash test loads are applied in a direction from the front edge of the seat bottom toward the seat back. The bracket 42 configured with the material thickness oriented as in FIG. 4 may offer improved structure and crash-worthiness when compared to multi-piece weldments. In other words, with the planes of the side walls 92, 94 oriented in the crash direction, the bracket 42 may have more resistance to bending than walls oriented with the planes of the walls perpendicular to the crash direction.

The cap 62 is adapted to close off the open end of the bracket 42 and/or provide the bearing surface 80 along the top side 72 of the housing 34. In this example, the cap 62 is sized to fit between the flanges 86 of the housing 34 and between the pair of bracket platforms 96. The cap 62 may be monolithic. In the illustrated example, a central portion 98 of the cap includes the bearing surface 80, and opposite end portions 100 of the cap may include various features as shown to aid in assembly and/or fitment of the cap with the bracket 42 and housing 34. The cap 62 may be deformed or bent over the housing 34 when installed to form a tight or interference fit with the housing. This embodiment includes a deformable clasp 102 that engages one of the platforms 96 of the bracket 42. When assembled, the cap bearing surface 80 and the curved bearing surfaces 82 of the bracket cooperate to locate the pivot axis 44 (see FIGS. 2 and 3) so that it intersects the longitudinal axis 40 of the rod 36.

The cap 62 is optional, as the seat pan or other component may provide a bearing surface of the desired shape to oppose the bearing surface(s) 76 of the housing 34. The cap is rendered optional due at least in part to the use of an already existing structural component, such as the seat pan, to close off the open end of the bracket sidewalls. Because the cap 62 need not be a structural component, its function can be directed toward other improvements. For example, the cap 62 may comprise a polymeric material. In particular, the bearing surface 80 may comprise a polymeric material. Polymeric materials such as acetal, polyolefins, or others can provide a lower friction and/or quieter bearing surface. The cap may be formed entirely from a filled or unfilled plastic, or a polymer or polymer-containing material may be provided as a layer at the bearing surface 80. Of course, metal or other non-polymeric materials may also be suitable. Where provided, the cap 62 need not necessarily be attached to the bracket 42. For example, the cap 62 may be located between the housing 34 and the seat pan during assembly and sandwiched therebetween with a clamp load holding the cap in place. In embodiments where the cap 62 is attached to the bracket via a snap-fit, such as that made possible by the deformable clasp 102, the entire seat tilt mechanism 12 can be provided, packaged and/or shipped as an assembly with the drive unit 66 securely contained in the bracket 42 without the need for welds or additional operations.

Figure 5:
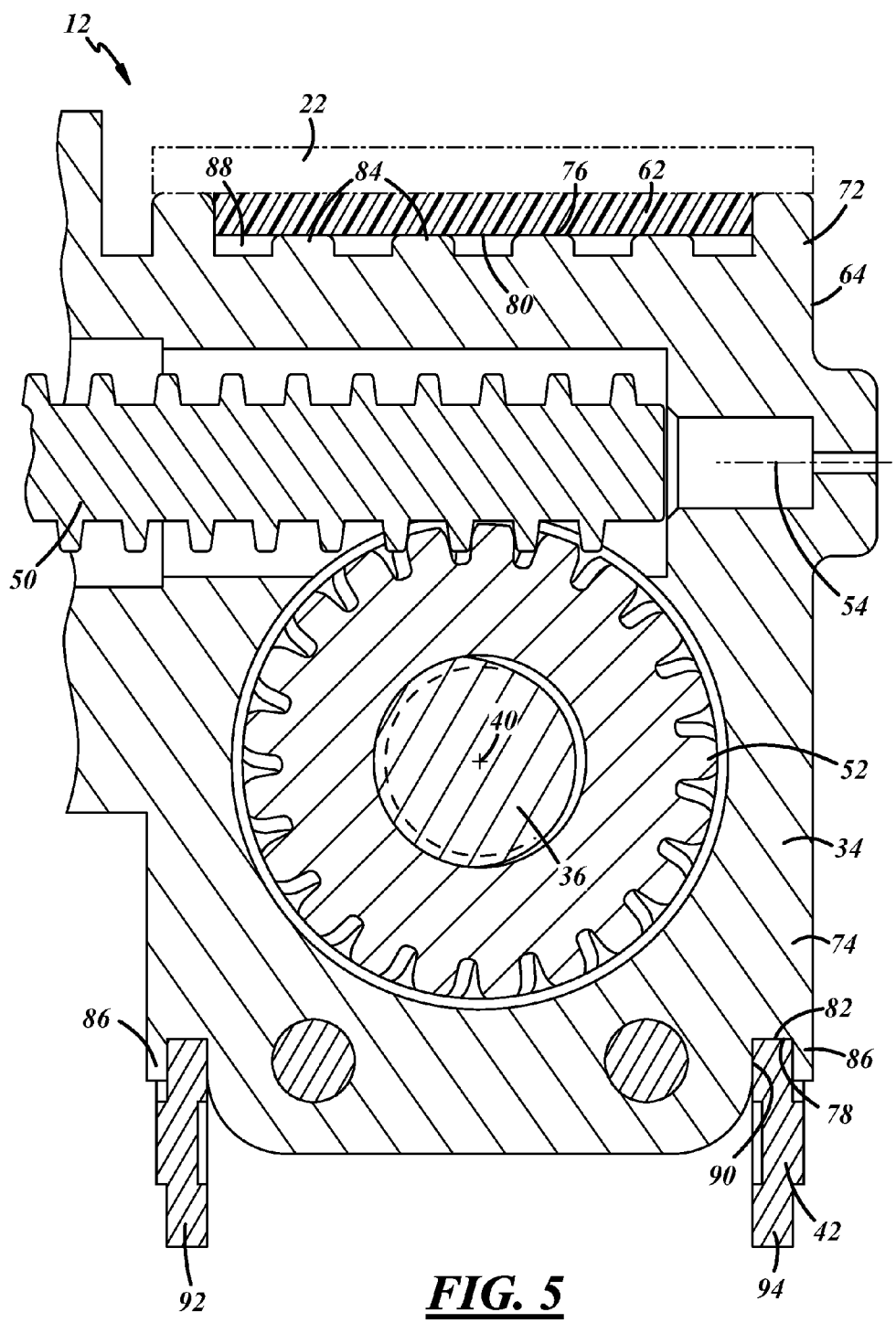
FIG. 5 is a cross-sectional view of the seat tilt mechanism of FIG. 3.

FIG. 5 is a partial cross-sectional view of the seat tilt mechanism 12 of FIG. 3 taken through the gearbox 64 and along the rotational axis 54 of the worm drive 50. The worm drive 50 is shown intermeshing with external teeth of the worm nut 52 and the threaded rod 36 engaged and arranged concentric with the worm nut with respect to the axis 40. A seat pan 22 is shown in phantom at the top side 72 of the housing 34, with the cap 62 located in the top channel 88 between the pair of housing flanges 86 and sandwiched between the housing and the seat pan. The bearing surface 80 of the cap 62 is shown opposing the plurality of bearing surfaces 76 located at the ends of the ribs 84.

The side walls 92, 94 of the bracket 42 are shown engaged with the pair of lower channels 90 at the bottom side 74 of the housing 34. The channels 90 are formed partly by end portions of the flanges 86 of the housing, partly by the bearing surfaces 78 of the housing, and partly by other housing surfaces. Besides providing the bearing surfaces 78 for sliding engagement with the bracket 42, the channel walls may also serve to maintain the housing 42 in its proper location with respect to the side walls 92, 94.

The above-described and illustrated embodiments of vehicle seat assemblies and seat tilt mechanisms are merely illustrative. Other configurations are possible consistent with the above teachings. For example, the seat tilt mechanism may be used to raise or lower the seat bottom relative to the seat base, to tilt the entire seat bottom relative to the seat base, to tilt the rear portion of the seat bottom, to tilt or otherwise move a portion of the seat back, or to move other vehicle components relative to one another as desired. The "top" and "bottom" designations used in the above description are not necessarily indicators of orientation for all embodiments. In some embodiments, two or more seat tilt mechanisms may be integrated into a vehicle seat or other device in order to move one component relative to another. In addition, the above-described rod and housing arrangements are not limited to worm gear-driven threaded rods. An actuator-drive gear may translate a toothed rack as the rod through a housing, such as in a rack-and-pinion configuration. Or a fluid pressure cylinder or solenoid may be configured to translate a shaft as the rod relative to a bushing as the housing. Arrangements are also possible that include a threaded rod directly or indirectly rotated about its longitundal axis by a motor or other actuator with a nut or other internally threaded housing being translated relative to the rod.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A vehicle seat, comprising:
   a seat base adapted for mounting to a vehicle floor;
   a seat back coupled to and extending up from the seat base;
   a seat bottom supported by the seat base, the seat bottom comprising a frame and a seat pan pivotally coupled with the frame; and
   a seat tilt mechanism, the seat tilt mechanism comprising:
      a housing having first and second oppositely facing external bearing surfaces;
      a rod pivotally coupled with the frame and extending through the housing along an axis;
      an actuator coupled with the rod and adapted to move the rod relative to the housing along said axis when activated; and
      a bracket that couples the housing with the seat pan so that the second external bearing surface faces away from the seat pan, the bracket having a curved bearing surface in sliding engagement with the second external bearing surface, whereby the seat pan tilts relative to the frame and the housing pivots within the bracket when the actuator moves the rod relative to the housing.

2. A vehicle seat as defined in claim 1, further comprising a cap located between the housing and the seat pan and having a bearing surface in sliding engagement with said first bearing surface.

3. A vehicle seat as defined in claim 2, wherein the bearing surface of the cap comprises a polymeric material.

4. A vehicle seat as defined in claim 2, wherein the cap is adapted for attachment to the bracket so that the housing remains coupled with the bracket when the bracket is uncoupled from the seat pan.

5. A vehicle seat as defined in claim 1, wherein the bracket is formed from a metallic material.

6. A vehicle seat as defined in claim 1, wherein the bracket is monolithic.

7. A vehicle seat as defined in claim 1, wherein the bracket comprises first and second spaced apart side walls extending away from the seat pan on opposite sides of the housing, each of the sidewalls having curved bearing surfaces in sliding engagement with the housing.

8. A vehicle seat as defined in claim 7, wherein the housing comprises first and second channels that each accommodate one of the bracket side walls, each of the channels having a bearing surface in sliding engagement with one of the curved bearing surfaces.

9. A vehicle seat as defined in claim 1, wherein the housing comprises a plurality of ribs extending toward the seat pan and a corresponding plurality of bearing surfaces at distal ends of the ribs, the first bearing surface being one of said corresponding plurality of bearing surfaces.

10. A vehicle seat as defined in claim 1, wherein the rod is a threaded rod and the actuator is coupled with the threaded rod via a gear train having an internally threaded nut intermeshed with the threaded rod so that relative rotational movement between the rod and the nut translates the rod relative to the housing along said axis.

11. A vehicle seat as defined in claim 1, wherein the bracket is coupled to the seat pan at a location that causes a front edge of the seat bottom to pivot about a pivot axis.

12. A seat tilt mechanism for use with a vehicle seat having a frame and a component pivotally attached to the frame, the seat tilt mechanism comprising:
    a housing having first and second oppositely facing external bearing surfaces;
    a rod adapted for pivotal attachment to the frame, the rod extending through the housing along an axis;
    an actuator coupled with the rod and adapted to move the rod relative to the housing along said axis when activated; and
    a bracket adapted for attachment to the seat component at a fixed location along the seat component so that the bracket couples the housing with the seat component with the second external bearing surface facing away from the seat component, the bracket having a curved bearing surface in sliding engagement with the second external bearing surface to allow the housing to rotate within the bracket.

13. A seat tilt mechanism as defined in claim 12, further comprising a cap attached to the bracket that provides a bearing surface in sliding engagement with the first external bearing surface.

14. A seat tilt mechanism as defined in claim 12, wherein the housing includes a pair of spaced apart channels, and the bracket includes a pair of spaced apart side walls in sliding engagement with the pair of channels.

15. A seat tilt mechanism as defined in claim 12, wherein the rod is a threaded rod and the actuator is coupled with the threaded rod via a gear train having an internally threaded nut intermeshed with the threaded rod so that relative rotational movement between the rod and the nut translates the rod relative to the housing along said axis.

\* \* \* \* \*